United States Patent [19]

Murakami

[11] 4,013,028

[45] Mar. 22, 1977

[54] IMPARTING OSCILLATING MOTION
[75] Inventor: Saburo Murakami, Osaka, Japan
[73] Assignee: Wataru Shimokawa, Japan
[22] Filed: Nov. 20, 1975
[21] Appl. No.: 633,878
[30] Foreign Application Priority Data
  Nov. 29, 1974  Japan ............................ 49-136318
[52] U.S. Cl. ................................ 112/220; 74/89.2
[51] Int. Cl.² ........................................ D05B 69/00
[58] Field of Search ............... 112/192, 220; 74/37, 74/82, 89.2, 89.22, 570, 571 R

[56] References Cited
UNITED STATES PATENTS

| | | | |
|---|---|---|---|
| 153,340 | 7/1874 | Holcroft | 74/82 |
| 1,116,814 | 11/1914 | Goodline | 74/82 X |
| 1,450,602 | 4/1923 | Mace | 112/220 |
| 2,788,758 | 4/1957 | Attwood et al. | 112/220 |

Primary Examiner—George H. Krizmanich
Attorney, Agent, or Firm—William Anthony Drucker

[57] ABSTRACT

In apparatus for imparting a swinging motion to a driven shaft from a drive shaft through a pair of eccentric discs or crank pins mounted on the drive shaft and link mechanisms, the link mechanisms comprise a pair of flexible links. Each link has a loop at one end thereof which encircles the eccentric disc or crank pin. The other ends of the links are connected to the driven shaft such that the other ends are wrapped about the driven shaft in the opposite direction and over an angle larger than the swinging angle of the driven shaft.

4 Claims, 6 Drawing Figures

Fig—1

IMPARTING OSCILLATING MOTION

BACKGROUND OF THE INVENTION

This invention relates to apparatus for converting the motion of a drive shaft continuously rotating at a constant speed into an oscillating motion.

Such oscillating motions are required by a shuttle swing over an angle of about 180°, a beam and a looper of a sewing machine. Typical prior art apparatus for converting continuous rotation into an oscillating motion includes a four member link mechanism. However, since such link mechanism is constructed such that its crank rod alternately transmits a tension and a compression to the driven link the crank rod is required to have sufficient strength to withstand such tension and compression.

Moreover, with the four member link mechanism it is impossible to vary the length of the driven link at a particular phase so that the driven link moves along a curve resembling a sine curve. More particularly, the driven link is moved along a curve of motion wherein the rotational speed is zero at the upper and lower dead points and reaches a maximum value at phases 90° apart from the upper and lower dead points. Furthermore, as the rotational angles at respective phases are determined automatically with respect to the maximum angle of oscillating it is impossible to provide a constant speed motion at a particular phase. For example, in the case of a driven link that reciprocates and rotates over an angle of 160°, assuming that the driven link rotates an angle of 8° for the rotary motion of the drive link of from 200° to 210°, it is impossible to change the ratio between the rotary angles of the drive and driven links so that it is impossible for the driven link to move along complicated curves.

Further, in the four member link mechanism it is absolutely necessary that the axes of rotation of respective links should be parallel with each other. As a consequence, the links and connecting pins should be accurately finished thus requiring labour and cost. It is also impossible to change the direction of rotation of the driven link so that it is necessary to use a long crank rod which is heavy and causes vibration.

Further, with the four member link mechanism it is impossible to directly obtain an angle of rotation of the driven link of more than 180° so that when an angle of rotation of more than 180° is desired an amplifying mechanism is required. Various links are connected together by openings and pins and in order to make smooth the operation and to decrease noise it is necessary to finish these openings and pins at high accuracies. Low finish accuracies result in backlash and wear as well as noise.

SUMMARY OF THE INVENTION

Accordingly, it is an object of this invention to provide improved apparatus for converting the rotary motion of a drive motion into an oscillating motion which is simple in construction and can eliminate the defect described above.

According to this invention there is provided apparatus for imparting an oscillating motion to a driven shaft from a drive shaft continuously rotating in one rotation through a pair of eccentric discs or crank pins mounted on the drive shaft with a phase difference of 180° and link mechanisms, characterized in that the link mechanisms comprise a pair of flexible links each having a loop at one end thereof, that the loops encircles the eccentric discs or crank pins, and that the other ends of the links are connected to the driven shaft by wrapping bodies such as cylindrical cams mounted thereon such that the other ends are wrapped about the driven shaft or the cylindrical cams in the opposite directions and over an angle larger than the oscillating angle of the driven shaft whereby the flexible links are pulled alternately by the rotation of the drive shaft thereby imparting an oscillating motion to the driven shaft.

The flexible link may take the form of a cord, belt, chain or the like. It is not necessary to make flexible the link throughout its length. That is the intermediate portion between the end loop at one end and the other end which is wrapped about the driven shaft may be formed by a rigid rod or lever.

With this construction, when the first crank pin or eccentric disc rotates to pull upwardly one of the flexible links the lower end of the flexible link is unwound from the driven shaft or the cylindrical cam mounted thereunto oscillate the driven shaft in one direction. At the same time the second crank pin or eccentric disc causes the other flexible link to descend whereby the lower end of this flexible link is wrapped about the driven shaft or the cylindrical cam mounted thereon. As the drive shaft rotates further, the second crank pin or eccentric disc pulls upwardly the second flexible link to unwind its lower end from the driven shaft or the cylindrical cam. At the same time the first crank pin or eccentric cam causes the first flexible link to descend whereby the lower end thereof is wrapped about the driven shaft. In this manner, an oscillating motion is imparted to the driven shaft by the drive shaft rotating in one direction.

The angle of oscillating can be varied by varying the radius of the driven shaft of the cylindrical cam or the crank radius of the crank pins or eccentric discs on the drive shaft. Thus for example, by making a peripheral length corresponding to 200° of the driven shaft or the cylindrical cam mounted thereon to be equal to twice of the crank radius of the crank pins or the eccentric discs, it is possible to oscillate the driven shaft over an angle of 200°.

It is also possible to obtain an angle of oscillating of the driven shaft at a specific phase of the drive shaft by suitably selecting the radius of the driven shaft or the cylindrical cam corresponding to the amount of vertical movement of the flexible links caused by the crank pins or eccentric discs at said specific phase.

For example, in order to oscillate the driven shaft over an angle of 15° between the phases of 210° and 220° of the drive shaft the radius of the cylindrical cam is determined such that the peripheral length of the cylindrical cam corresponding to the rotation over 15° is equal to 2 mm when the amount of the vertical movement of the flexible links between said phases is 2 mm for example. On the other hand, where the amount of the vertical movement of the flexible links is 1.5 mm, the radius of the cylindrical cam is determined such that its peripheral length corresponding to 15° oscillating is equal to 1.5 mm. By so selecting it is possible to eliminate any slip between the flexible links and the crank pins or eccentric discs thus imparting an oscillating angle of 15° without any backlash.

By disposing guide pins at an intermediate point of the flexible links it is possible to vary the relative angular positions of the drive shaft and the driven shaft. According to invention it is easy to vary the oscillating angle of the driven shaft irrespective of the length of the flexible links. Where an oscillating angle of more than 180° is desired it is necessary to use two independent cylindrical cams whereas where the desired oscillating angle is less than 180° it is only necessary to use a single cylindrical cam in which case the lower ends of the flexible links are connected to the opposite sides of the cylindrical cam.

Brief Description of the Drawings

Further objects and advantages of the invention can be more fully understood from the following detailed description taken in conjunction with the accompanying drawings in which.

Description of the Preferred Embodiment

Figure 1:
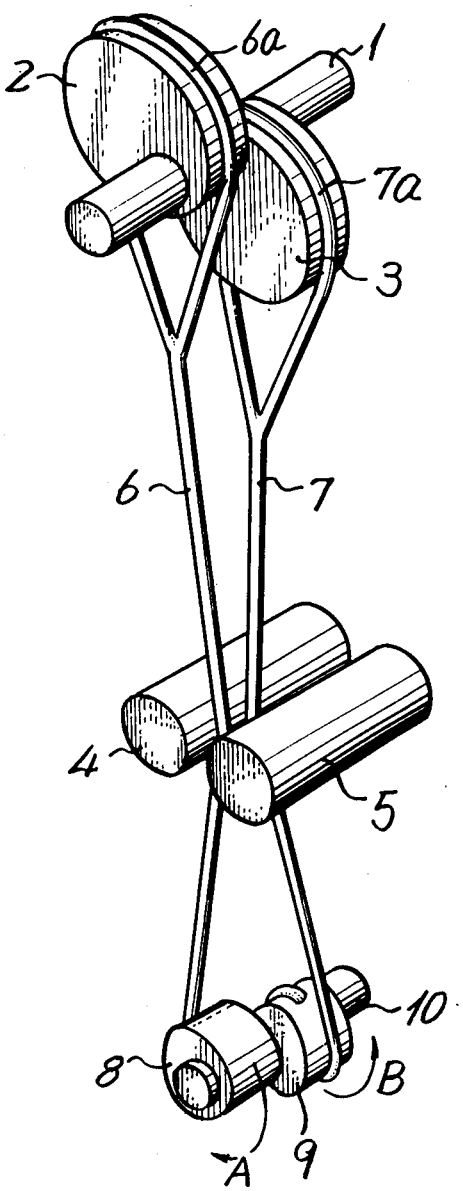
FIG. 1 is a diagrammatic perspective view of the essential parts of the apparatus for imparting an oscillating motion to a shaft constructed according to the teaching of this invention.

Referring now to FIG. 1 of the accompanying drawings, a drive shaft 1 driven by an electric motor and the like is rotatably supported by bearings of the machine frame, not shown and two eccentric discs 2 and 3 having a phase difference of 180° are secured to the shaft 1. Ring shaped members 6a and 7a on one end of respective flexible links 6 and 7 which do not elongate and contract and guided at their intermediate points by guide pins 4 and 5 encircle the eccentric discs 2 and 3 respectively under a suitable tension. The opposite ends of the flexible links 6 and 7 are wrapped in the opposite direction about wrapping bodies in the form of cylindrical cams 8 and 9 secured to a driven shaft 10. The sum of the wrapping angles is larger than the oscillating angle of the driven shaft.

In operation, when the first eccentric disc 2 is rotated from the lower dead center toward the upper dead center by the drive shaft 1 rotating in one direction the lower end of the first flexible link 6 is unwound to rotate the first cylindrical cam 8 and the driven shaft 10 in the direction of an arrow A. At this time since the second eccentric disc 3 is rotated from its upper dead point to its lower dead point the lower end of the second flexible link 7 is wrapped about the second cylindrical cam 9. When the first eccentric disc 2 passes its upper dead point the second eccentric disc 3 begins to rotate from its lower dead point toward its upper dead point with the result that the lower end of the second flexible link 7 is unwound thus rotating the second cylindrical cam 9 and the driven shaft 10 in the direction of arrow B. At this time, the lower end of the first flexible link 6 is wrapped about the first cylindrical cam 8.

When the first and second cylindrical cams 8 and 9 are circular, the amount of the vertical movement of the flexible links varies in accordance with a sine curve so that the driven shaft 10 oscillates in accordance with a curve approximating a sine curve. However, as can be noted from the foregoing description, if the peripheral length of the cylindrical cam from which the flexible link is unwound is longer than the upward movement of flexible link at a given phase of the drive shaft 1, the angle of rotation of the cylindrical cam would decrease and vice versa. For this reason, it is possible to vary as desired the angle of rotation of the driven shaft at a given phase of the drive shaft by varying the radius of the cylindrical cam. As a consequence, it becomes possible to readily vary the angle of oscillation of the driven shaft. Moreover, it is possible to impart any desired oscillation angle to the driven shaft without any backlash.

Figure 2:
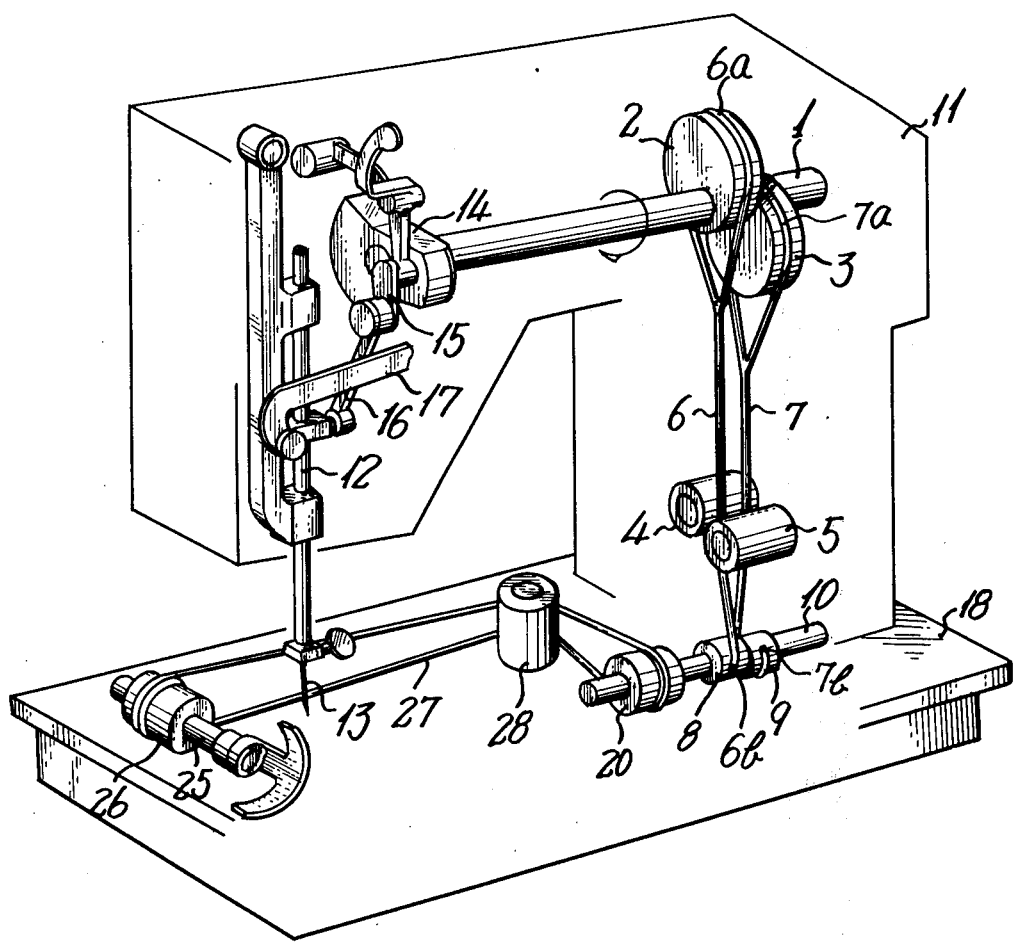
FIG. 2 is a perspective view of a zig-zig sewing machine utilizing a half revolution front shuttle driven by the apparatus of this invention.
Figure 3:
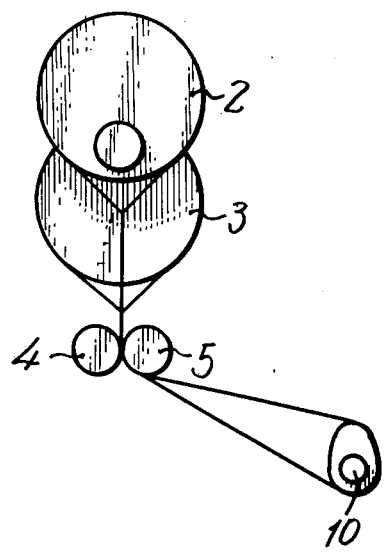
FIGS. 3 to 6 are diagrams useful to explain the manner of changing the position of the guide pins so as to vary the positions of the upper and lower dead points in accordance with the positions of the drive shaft and driven shaft.
Figure 4:
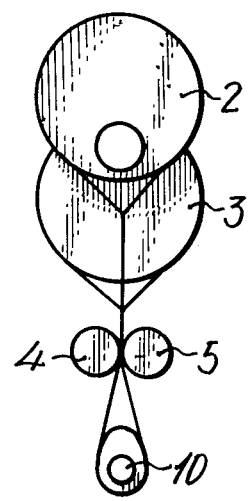
Figure 5:
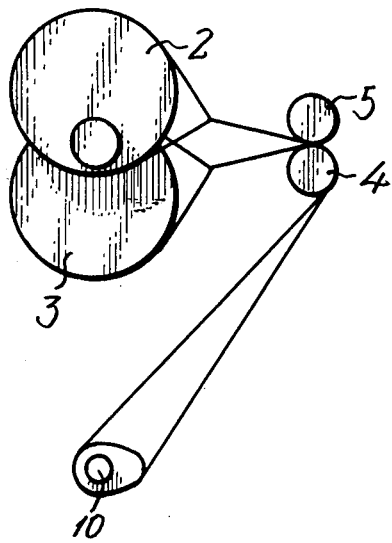
Figure 6:
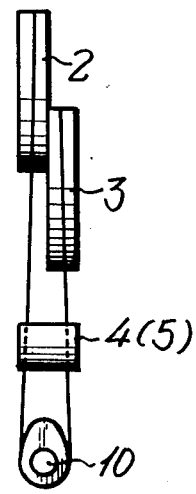

FIG. 2 shows an application of this invention for driving a shuttle of a zig-zag type sewing machine. As shown the drive shaft 1 driven by an electric motor (not shown) is supported in an overhead portion of the sewing machine. A needle bar 12 supporting a needle 13 at the lower end thereof is connected to one end of the drive shaft 1 through a crank arm 14 and links 15 and 16 so as to be movable in the vertical direction. An oscillating link 17 is connected to the needle link for effecting zig-zag sewing operations. However, these members do not constitute the subject matter of this invention their detailed description is believed unnecessary.

According to this invention two 180° dephased eccentric discs 2 and 3 are secured to the drive shaft 1 at suitable positions thereof. A driven shaft 10 rotatably supported by the machine bed 18 is provided with two cylindrical cams 8 and 9 and a pulley 20. The cylindrical cams 8 and 9 and the eccentric discs 2 and 3 are interconnected by the flexible links 6 and 7 described above. The lower ends of the flexible links are secured to the cylindrical cams 8 and 9 at points 6b and 7b and their intermediate portions are guided by pins 4 and 5.

The shuttle shaft 25 is driven by pulley 20 through an endless belt 27 and a pulley 26 secured to the shuttle shaft 25. Alternatively, a flexible belt may be substituted for the endless belt with its opposite ends secured to the pulleys 20 and 26 so as to be wrapped thereabout over an angle larger than the maximum swinging angle of the shuttle. A guide roller 28 is provided for guiding the endless belt 27.

With this construction, when the drive shaft 1 is rotated, the needle bar 12 is moved in the vertical direction while at the same time oscillated with an adjustable amplitude. Concurrently therewith two eccentric discs 2 and 3 are rotated together with the drive shaft 1 for imparting an oscillating motion to the driven shaft 10 and the shuttle shaft 25 in a manner described above.

Where it is necessary to reduce the crank radius of a crank pin or an eccentric disc contained in a machine frame of a limited space or where it is necessary to increase the radius of the cylindrical cam for the purpose of making easy the machining of the cylindrical cam or to increase the durability of the flexible link or cord, the angle of rotation of the driven shaft 10 is decreased and the diameter of the pulley 20 mounted on the driven shaft 10 is increased, whereby it is possible to decrease the diameter of the pulley 26 for the shuttle shaft without changing the swinging angle of the shuttle.

Where the angle of rotation of the driven shaft is smaller than 180° a single cylindrical cam having cam surfaces on the opposite sides may be used.

In the foregoing description, each of the flexible links 6 and 7 is described as comprising a single continuous flexible cord but it is also possible to construct each link with a solid intermediate link and two flexible cords adapted to be wrapped about the eccentric disc and the cylindrical cam.

Further by changing the position of the guide pins 4 and 5 as shown in FIGS. 3 to 6 it is possible to change the upper and lower dead centers of the driven shaft irrespective of the relative position of the drive and driven shafts. In this manner by positioning the guide pins at suitable positions it is possible to provide oscillating motions having different upper dead centers by using the same crank pin or eccentric disc.

Further by wrapping the lower ends of the flexible links about cylindrical cams in the opposite directions it is possible to impart to the driven shaft oscillating motions having a phase difference of 180° by the same crank pin or eccentric disc.

The relative position between the drive and driven shafts can be varied either by changing the positions of one or both of them or by varying the position of the guide pins as shown in FIGS. 3 to 6.

According to invention since flexible links are used for converting the rotary motion of a drive shaft into an oscillating motion of a driven shaft it is possible to eliminate various defects of the four member link mechanism.

For example, when the invention is applied to drive the shuttle of a sewing machine, since the flexible links or cords are pulled alternately for imparting an oscillating motion to the shuttle, the links are not required to have strength to withstand compressive forces. Accordingly, in contact with the crank rod of a prior art four member link mechanism utilized to swing the shuttle of a sewing machine it is possible to construct the link mechanism to be light weight and nonexpensive.

Further, use of flexible link mechanism permits ready adjustment of the relative position of the drive and driven shafts as has been pointed out hereinabove. Similarly, increase or decrease of the oscillating angle can readily be accomplished by varying the diameters of the cylindrical cams 8 and 9. Moreover, as one ends of the flexible links are securely fastened to the cylindrical cams there is no fear of slip.

In a conventional zig-zag sewing machine utilizing an oscillating needle bar and a shuttle swing of 180°, spiral bevel gears are used for the purpose of changing the direction of swinging and increasing the swinging angle of the shuttle. However, according to this invention, it is possible to readily change the direction as well as the angle of swinging of the shuttle by a guide roller and by changing the diameter of the cylindrical cam so that it is not necessary to use any mechanism for varying the angle of swinging.

Further in an overlocking and interlocking types of the sewing machine the shafts of the upper and lower loopers are disposed at right angles with respect to the drive shaft and since it is necessary to move the upper and lower loopers at different phases it has been the practice to drive these shafts by two spherical crank pins mounted on the drive shaft at different phases. It is difficult to manufacture such drive shaft and crank pins. However, according to this invention, since the motion transmission is effected by the flexible links, it is easy to change the direction of rotation of the driven shaft in the same manner as in conventional belt drive. Further, by using a guide pin or roller, it is possible to drive the upper and lower loopers at difference phases by using a pair or crank pins or eccentric discs. Further, as a flexible link mechanism is used for motion trasmission, it is not necessary to precisely finish pins and holes of a 4 member link mechanism.

According to this invention, as it is possible to increase or decrease the speed of oscillation of the driven shaft at any phase it is possible to drive the driven shaft along any desired curve. With this construction, it is possible to increase the speed of the inner shuttle at a time when the needle and the shuttle of a needle bar oscillating type zig-zag sewing machine cross each other while the needle bar is being raised thus increasing the width of the zig-zag.

When the novel flexible link mechanism is applied to drive a beam and an inner shuttle it is possible to improve the relationship between the quantity of the thread supplied by the beam and the quantity of the thread drawn by the inner shuttle thus producing improved seams.

As the driven shaft is driven by wrapping and unwrapping the flexible links about and from the cylindrical cam there is no knee in the link mechanism as in the four member link mechanism. Accordingly, the novel flexible link mechanism has simple construction, and has no backlash, noise and wear.

While the invention has been shown and described in terms of a preferred embodiment thereof, it should be understood that many changes and modifications will occur to one skilled in the art without departing from the true spirit and scope as defined in the appended claims.

For example, it is clear that the invention is also applicable to many other applications than sewing machines.

What is claimed is:
1. Apparatus, for imparting an oscillating motion to a driven shaft from a drive shaft rotating continuously in one direction, comprising:
   i. first and second cranks mounted on said drive shaft at 180° opposed positions
   ii. first and second inextensible links each having a first end and a second end and a flexible portion, said first link being coupled at its first end to said first crank, said second link being coupled at its first end to said second crank
   iii. first and second winding bodies mounted on said driven shaft, the second end of the first link being secured to said first winding body and being wound round said first winding body in one direction about the axis of rotation of the driven shaft for a length greater than the throw of said first crank, the second end of the second link being secured to said second winding body and being wound round said second winding body in the opposite direction about the axis of rotation of the driven shaft for a length greater than the throw of said second crank
   iv. guide means disposed between said cranks and said wrapping bodies, said guide means having opposed spaced surfaces defining an opening in which said flexible portion of each link is positioned such that both links move through said opening.

2. Apparatus, as claimed in claim 1, wherein said first and second wrapping bodies are respective cylindrical cams mounted on said driven shaft at 180° opposed positions.

3. Apparatus, as claimed in claim 1, wherein said first and second cranks are respective eccentric discs, and wherein said first ends of said first and second links are respective loops engaged about the respective disc.

4. In a sewing machine including a drive shaft and a driven shaft and an angularly oscillatable shuttle shaft, the improvement which comprises:
   a. apparatus as claimed in claim 1 for imparting oscillating motion to said driven shaft from said drive shaft rotating continuously in one direction
   b. first pulley means on said driven shaft
   c. second pulley means on said shuttle shaft, and
   d. an endless belt engaged about said first and second pulley means and serving to transmit the oscillating motion of the driven shaft to the shuttle shaft.

* * * * *